US012236041B2

(12) United States Patent
Duan et al.

(10) Patent No.: US 12,236,041 B2
(45) Date of Patent: Feb. 25, 2025

(54) METHOD AND SYSTEM FOR IDENTIFICATION OF USER MANEUVER INTENTION WHEN OPERATING WITH TOUCH SURFACE CONTROLLER

(71) Applicant: Kostal of America, Inc., Troy, MI (US)

(72) Inventors: Xiaozhong Duan, Troy, MI (US); Peter Glen Elphick, Rochester, MI (US); Zhiping Hu, Troy, MI (US); Steven R. Hoskins, Wolverine Lake, MI (US); Kenneth S. Koscielniak, Farmington Hills, MI (US)

(73) Assignee: Kostal of America, Inc., Troy, MI (US)

( * ) Notice: Subject to any disclaimer, the term of this patent is extended or adjusted under 35 U.S.C. 154(b) by 0 days.

(21) Appl. No.: 18/236,764

(22) Filed: Aug. 22, 2023

(65) Prior Publication Data

US 2024/0168586 A1 May 23, 2024

Related U.S. Application Data

(63) Continuation-in-part of application No. 17/993,424, filed on Nov. 23, 2022, now Pat. No. 11,789,540.

(51) Int. Cl.
*G06F 3/041* (2006.01)

(52) U.S. Cl.
CPC ........ *G06F 3/0418* (2013.01); *G06F 3/04142* (2019.05)

(58) Field of Classification Search
CPC ............... G06F 3/0418; G06F 3/04142; G06F 3/03547; G06F 3/0362; G06F 3/0416; G06F 3/02
See application file for complete search history.

(56) References Cited

U.S. PATENT DOCUMENTS

| | | | |
|---|---|---|---|
| 6,681,880 B2 | 1/2004 | Bernhardt et al. | |
| 7,516,675 B2 | 4/2009 | Kurtz et al. | |
| 9,761,094 B2 | 9/2017 | Simon | |
| 10,032,592 B2 | 7/2018 | Brooks et al. | |
| 10,088,937 B2 | 10/2018 | Hoen et al. | |
| 10,331,239 B2 | 6/2019 | Grant et al. | |
| 2015/0177899 A1 | 6/2015 | Degner et al. | |
| 2017/0177152 A1 | 6/2017 | Sato et al. | |
| 2018/0321789 A1* | 11/2018 | Sato | G06F 3/04144 |
| 2020/0348757 A1 | 11/2020 | Forest et al. | |
| 2020/0396322 A1 | 12/2020 | Park et al. | |

* cited by examiner

*Primary Examiner* — Temesghen Ghebretinsae
*Assistant Examiner* — Ivelisse Martinez Quiles
(74) *Attorney, Agent, or Firm* — Gunther J. Evanina; BUTZEL LONG

(57) ABSTRACT

A human-machine interface device includes a touch receiver having a plurality of touch surfaces in distinctly different planes, an elastic strain sensing element having a base and a plurality of legs extending from the base and contacting an associated touch surface, a first linear strain gauge mounted on each leg to detect strain along a first direction and a second strain gauge mounted on each leg to detect strain along a second direction that is different from the first direction, and a processor configured to receive the signals from the strain gauges and determines a command operation intended by a user of the human-machine interface device.

13 Claims, 14 Drawing Sheets

METHOD AND SYSTEM FOR IDENTIFICATION OF USER MANEUVER INTENTION WHEN OPERATING WITH TOUCH SURFACE CONTROLLER

CROSS-REFERENCE TO RELATED APPLICATIONS

This application is a continuation-in-part of U.S. patent application Ser. No. 17/993,424, filed Nov. 23, 2022, the contents of which is incorporated herein by reference in its entirety.

FIELD OF THE DISCLOSURE

This disclosure pertains to methods and systems for using and filtering multiple strain sensor signals from a touch surface controller to identify a user's intention when operating the controller.

BACKGROUND OF THE DISCLOSURE

U.S. patent application Ser. No. 17/993,424, filed Sep. 15, 2022 describes a human-machine interface touch surface controller including a contoured user interface having opposite front and rear touch surfaces, opposite left and right side surfaces and a top surface; a strain plate having strain surfaces that each correspond with one of the front, back, left or right touch surfaces so that pressure applied to a touch surface causes strain in a corresponding strain surface; a strain gauge associated with each strain surface; and an electrical connection between each strain gauge and a microcontroller. It is suggested in the application that various user operations (maneuvers) on the touch surface controller, such as application of torque about mutually perpendicular axes or application of pressure on to opposing side touch surfaces will generate a set of strain gauge signals that can be readily associated with an assigned vehicle operation. While this is generally the case, there remains a need to accurately distinguish between a user intended operation/maneuver on the user interface and unintentional or incoherent operation/maneuver of the interface.

SUMMARY OF THE DISCLOSURE

A human-machine interface device capable of accurately determining an intended command of a user based on user operation (maneuver) of the device is described. The device includes a touch receiver having a plurality of touch surfaces to which a user may apply forces or torque indicative of an intended user command, and an elastic strain sensing element having a base and a plurality of legs extending from the base, wherein each leg is in contact with or attached to an associated overlying touch surface such that pressure applied to a touch surface causes strain in the associated leg. A first linear strain gauge is mounted on each leg to detect strain along a first direction and a second linear strain gauge is mounted on each leg to detect strain along a second direction. A microprocessor is electrically connected with each of the strain gauges to receive an associated signal. The signals are processed to accurately correlate the user operation (maneuver) with an intended command. The human-machine interface device provides multiple user interactive functions for vehicle control applications universally. It is accordingly named as Universal Interactive Sensing device and abbreviated as UIS device in this application.

Also disclosed is a processor operating an algorithm utilizing multiple sensor signal processing and machine learning techniques to identify user intended operations (maneuvers) on the UIS device through the inference of the sensor signal patterns using an optimized trained neural network.

DETAILED DESCRIPTION

Figure 3A:
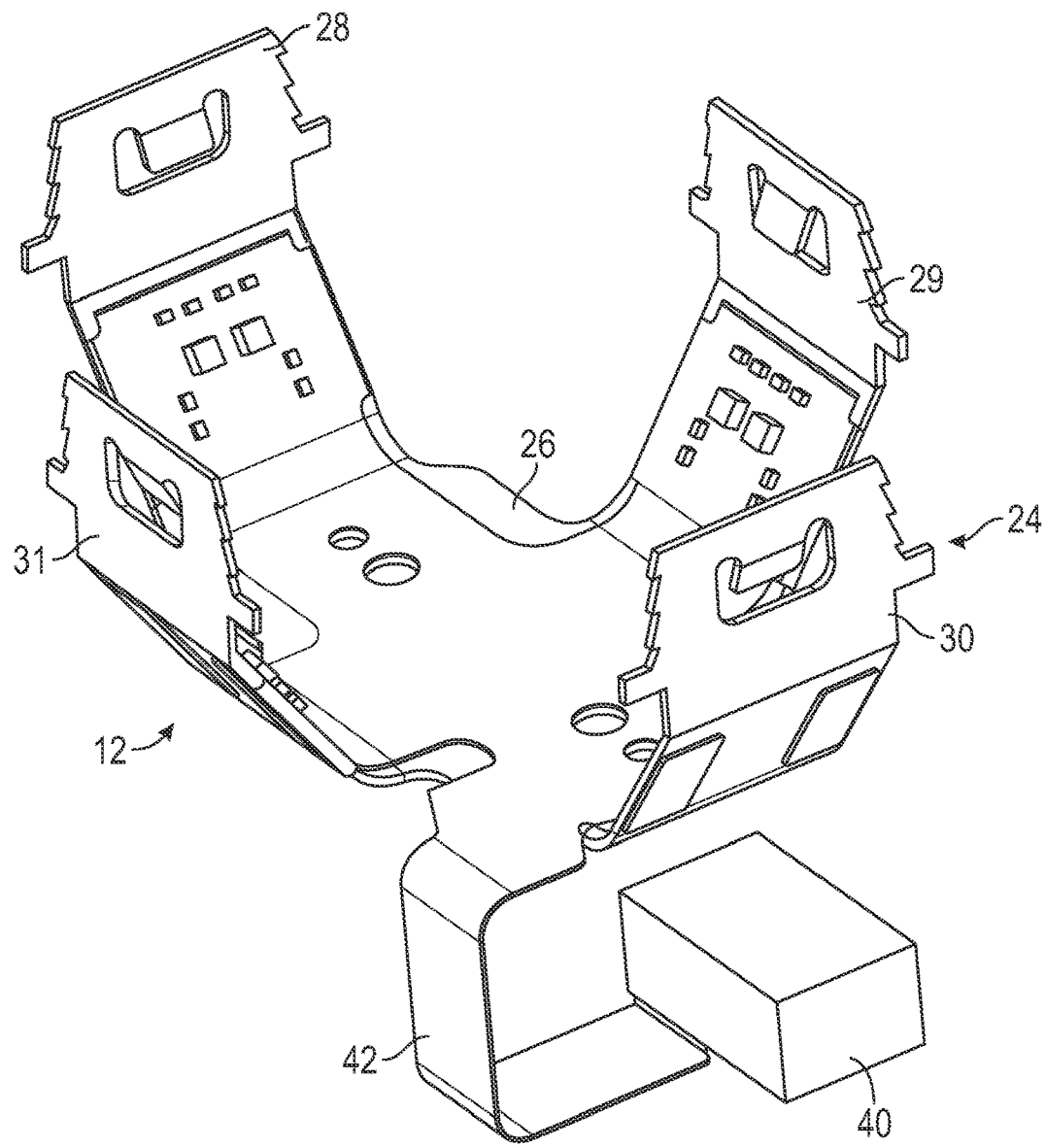
FIG. 3A is an assembly diagram in perspective view of a touch receiver and the strain sensing element having four legs.

A human-machine interface (UIS) device 10 is shown in FIG. 3A (in a partially disassembled state) and 3B. Device 10 includes a touch receiver 12 having a plurality of touch surfaces, including front touch surface 14, rear touch surface 16, left touch surface 18, right touch surface 20, and a bottom touch surface 22. Device 10 also includes an elastic strain sensing element 24 having a base 26 and a plurality of legs 28, 29, 30 and 31 (first, second, third and fourth legs, respectively). Each leg is in contact with or attached to an associated overlying touch surface of the touch receiver 12 such that pressure and/or torque applied to a touch surface causes strain in the associated leg.

Figure 1A:
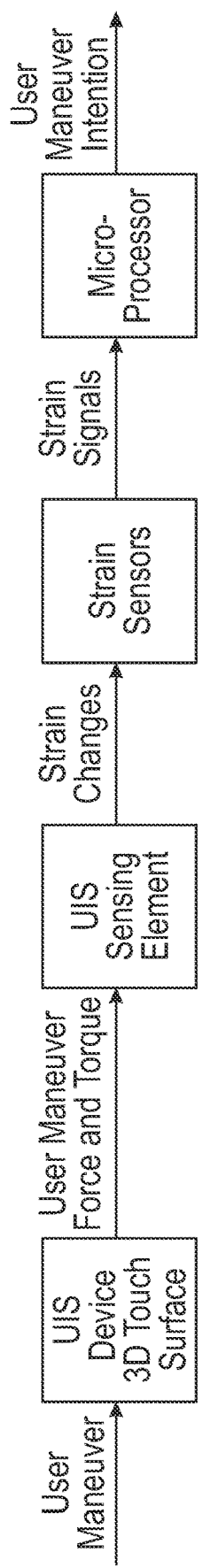
FIG. 1A is a block diagram indicating how user operations (maneuvers) on the human-machine interface device (the UIS device) are transferred and processed to determine the intended user command associated with the user's operations (maneuvers) on the device.
Figure 1B:
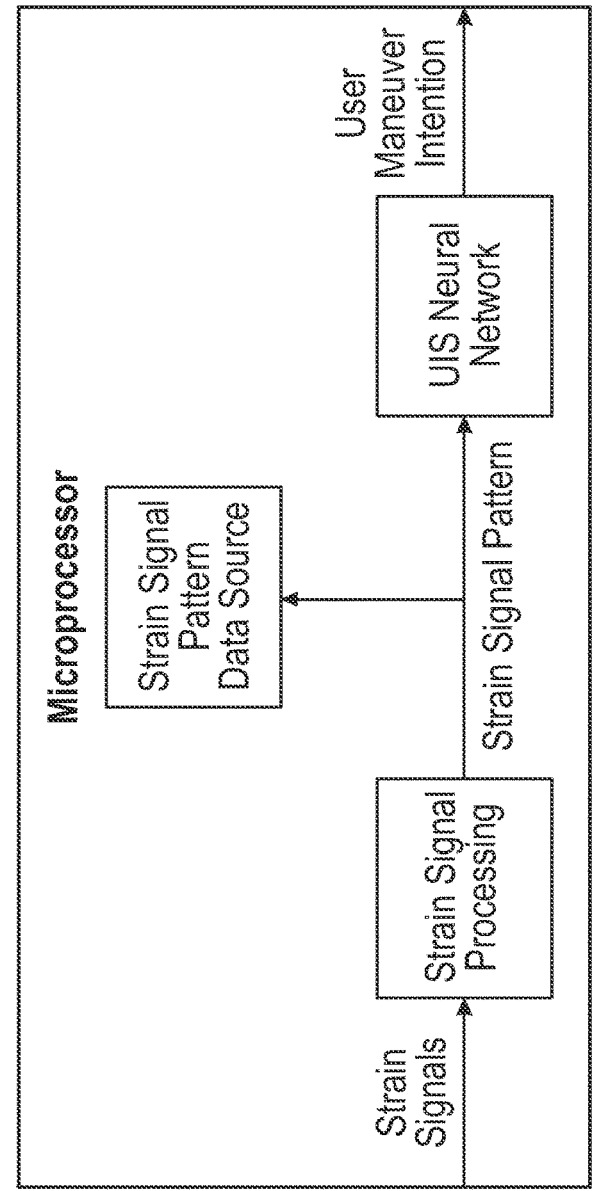
FIG. 1B is a block diagram showing additional detail of the microprocessor.
Figure 2:
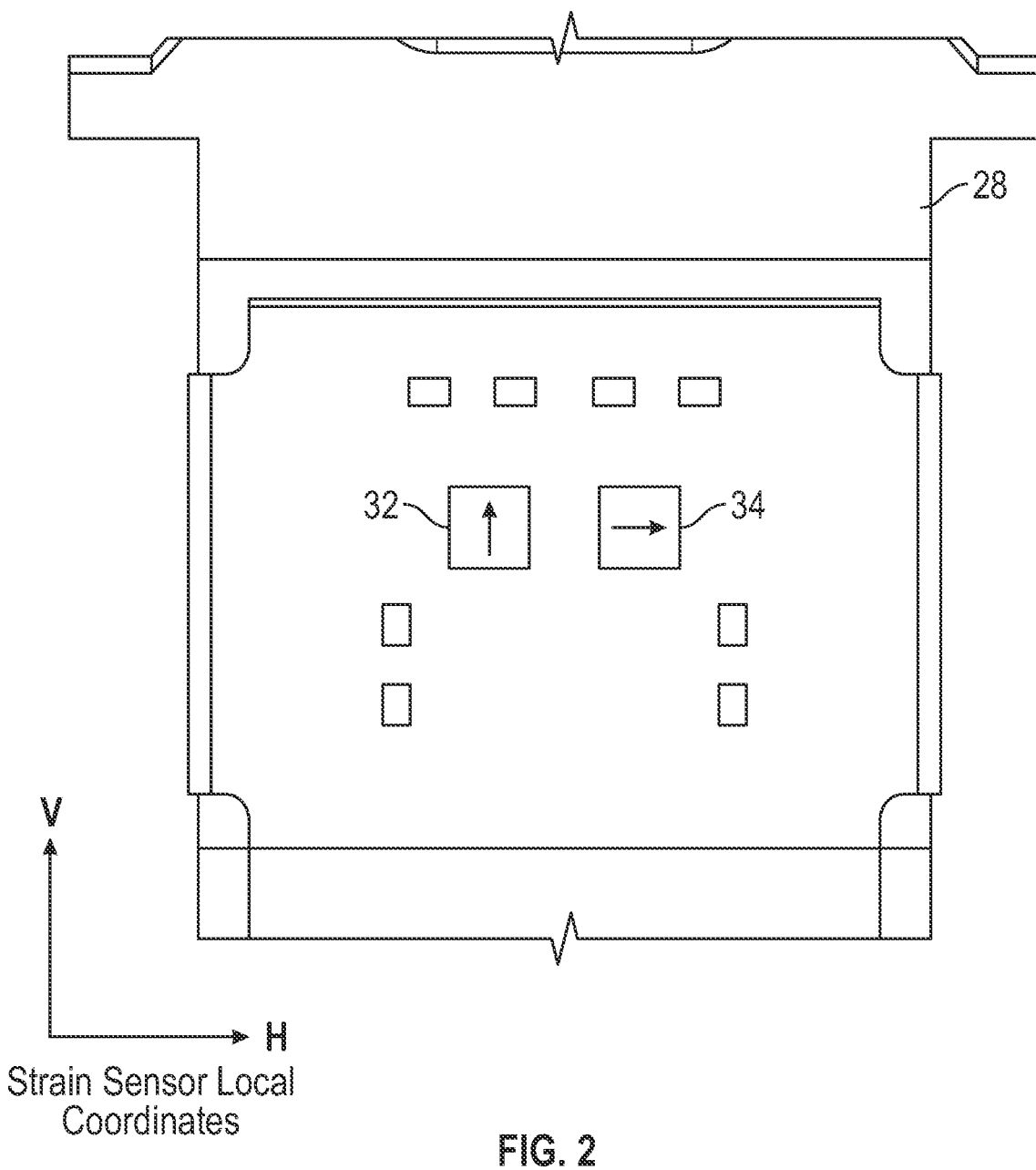
FIG. 2 is an enlarged plan view of a strain sensor board attached on a leg of the elastic strain sensing element shown in FIG. 3.

As best illustrated in FIG. 2, each leg (e.g., leg 28) has a first linear strain gauge 32 mounted thereon to detect strain along a first direction (e.g., the vertical direction) and a second strain gauge 34 mounted on the leg to detect strain along a second direction (e.g., the horizontal direction). Strain gauges 32, 34 transmit signals indicative of the vertical and horizontal strain imposed on each leg when a user operates (maneuvers) the device 10. A processor 40 receives the strain signals from the strain gauges via a flex circuit 42. Processor 40 is configured to process the strain signals to determine an intended user command associated with the user operation (maneuver) of the UIS device 10.

The UIS device 10 can be in the form of various shapes that look like a plate, a mouse, a joystick, a lever stick, a handle, and/or other shapes that can allow a user to operate (maneuver) with hand/hands.

User operations (maneuvers) such as push, pull, turn left, turn right, pinch lightly, pinch strongly, etc., are listed but not limited to the user maneuver examples in Table 1. An operation (maneuver) of the UIS device 10 can generate forces and torques that are applied to the UIS touch receiver 12 and transmitted to the strain sensing element 24. The strain sensing element 24 generates strain changes that are detected by the strain sensors 32 and 34 on legs 28, 29, 30 and 31, respectively at the same time. The microprocessor 40 takes output of strain sensor signals, processes the signals through the software of UIS strain signal processing and generates strain signal patterns that are associated with the user operation (maneuver). The strain signal pattern is represented by a data set for each operation (maneuver) and collected by the processor 40 to establish the data source of the strain signal pattern for all kinds of user operations maneuvers) shown in Table 1.

A neural network (UIS Neural Network) is trained based on the signal pattern data source and the labeled user maneuvers. The trained and optimized UIS Neural Network is deployed as the software component in the microprocessor to input the strain signal pattern data and output the identified user command intention of the operation (maneuver) through the inference computing of the UIS Neural Network.

A strain sensor board illustrated in FIG. 2 is a two-dimensional strain sensing component that outputs the strain measurement of two perpendicular strains through strain sensors mounted perpendicularly on the sensor circuit board. The strain sensor 32 is installed to detect the strain in a vertical direction. The strain sensor 34 is installed to detect the strain in the horizontal direction. The sensor board on which both sensors are mounted is a PCB or flexible circuit board or other kind of circuit base joined to or contacting strain sensing element 24. The strain sensor board outputs signals from strain sensors 32 and 34, Sv(t) and Sh(t), where t stands for time, Sv(t) is vertical strain and Sh(t) is horizontal strain.

Figure 3B:
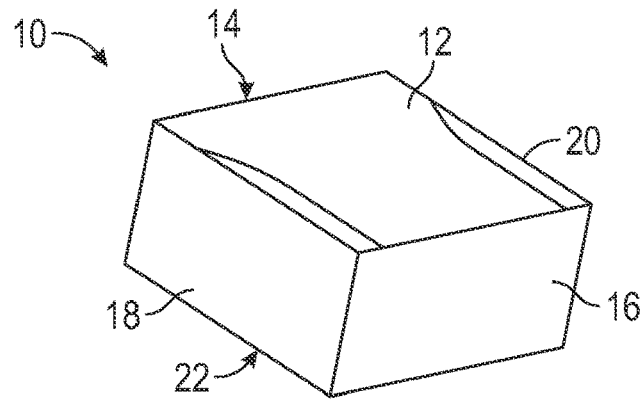
FIG. 3B is a perspective view of a UIS device with touch receiver that overlies and contacts the strain sensing element.

Strain sensing element 24 can be of metal or plastic sheet material or any other kind of material that creates strain changes on the surfaces of its legs when the element is installed in the UIS device 10 (FIG. 3). When the user maneuvers with force and torque applied to the UIS device, the strain sensing element 24 will detect the user maneuver input force and torque through the strain changes on the surfaces of its legs. The number of legs of strain sensing element 24 may be one, two, three or four or more depending on the configuration of the UIS device. Each leg is joined with a sensor board segment (FIG. 2) having two strain signal outputs, Sv(x, t) and Sh(x, t), where x is the leg number (1, 2, 3, 4 or more).

A leg signal vector is created based on the dual outputs of the corresponding Sensor Board, Sy(t) and Sh(t). For a given Leg x:

The vector magnitude $VM(x, t) = SQRT(Sv(x, t)^2 + Sh(x, t)^2)$

The vector direction reference to the coordinate $VD\text{-angle}(x, t) = ATAN(Sv(x, t)/Sh(x, t))$ Where SQRT is the square root function, ATAN is the arctangent function.

Figure 4:
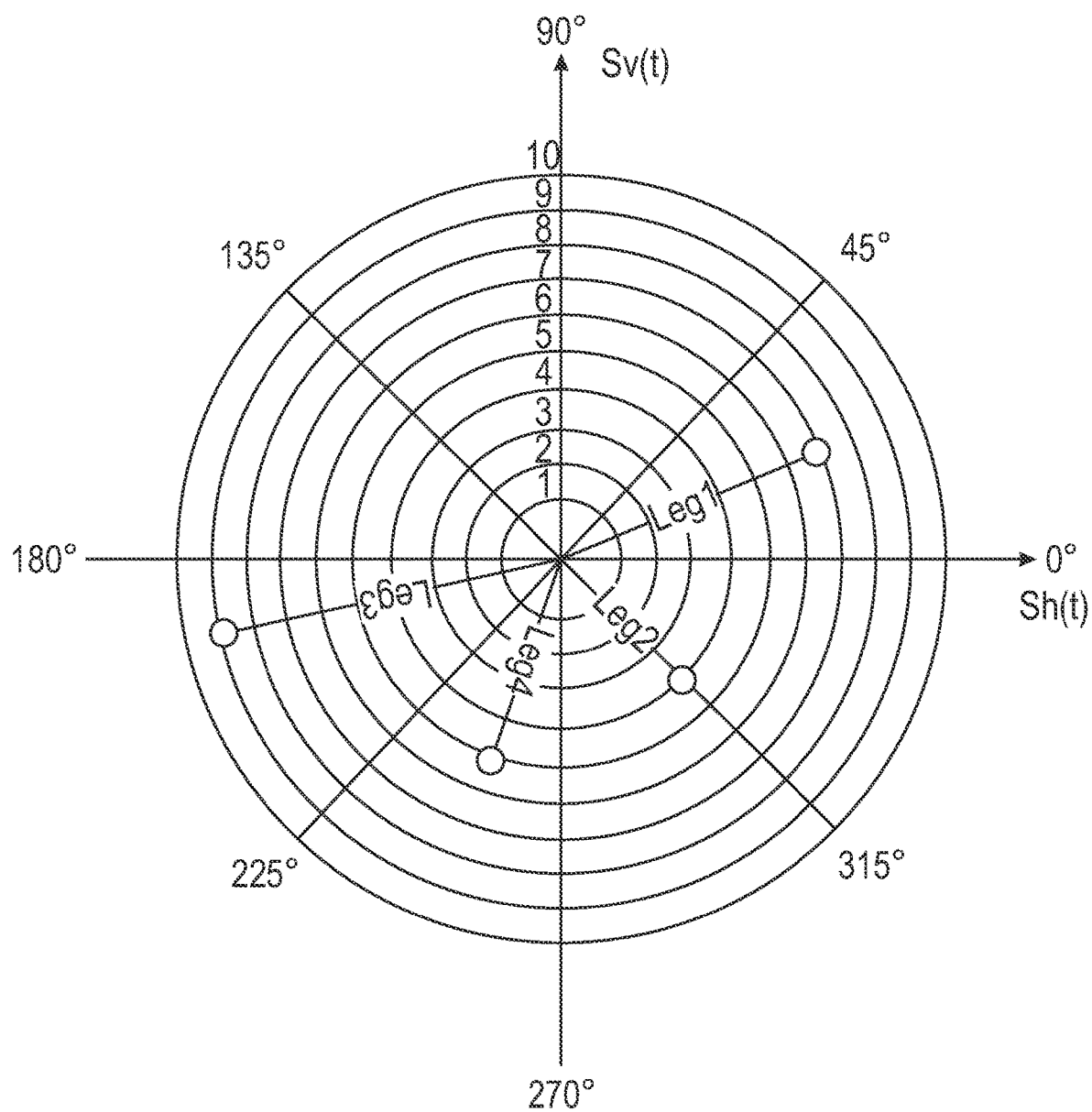
FIG. 4 is a vector representation of the signal pattern of the strain sensing element of FIG. 3 associated with a specific user maneuver of the UIS device.

FIG. 4 shows the 4 Leg signal vectors on a shooting target at a specific time.

Leg1 VM=7, VD-angle=22.5°
Leg2 VM=4, VD-angle=315°
Leg3 VM=9, VD-angle=190°
Leg4 VM=5, VD-angle=247.5°

The signal pattern of strain sensing element is the map where all leg vectors are calculated and presented in magnitude and direction angle. For example, in FIG. 4 the map is all the four leg vectors represented by their magnitudes and direction angles shown above. The signal patterns correlate to the user maneuver of a UIS device through the information transfer from maneuver generated force and torque to the strain changes of the strain sensing element and further to the measured vector map from the sensor boards. The measured vector map is the signal pattern in real time. It is the response to the user maneuver on the UIS device.

Figure 5:
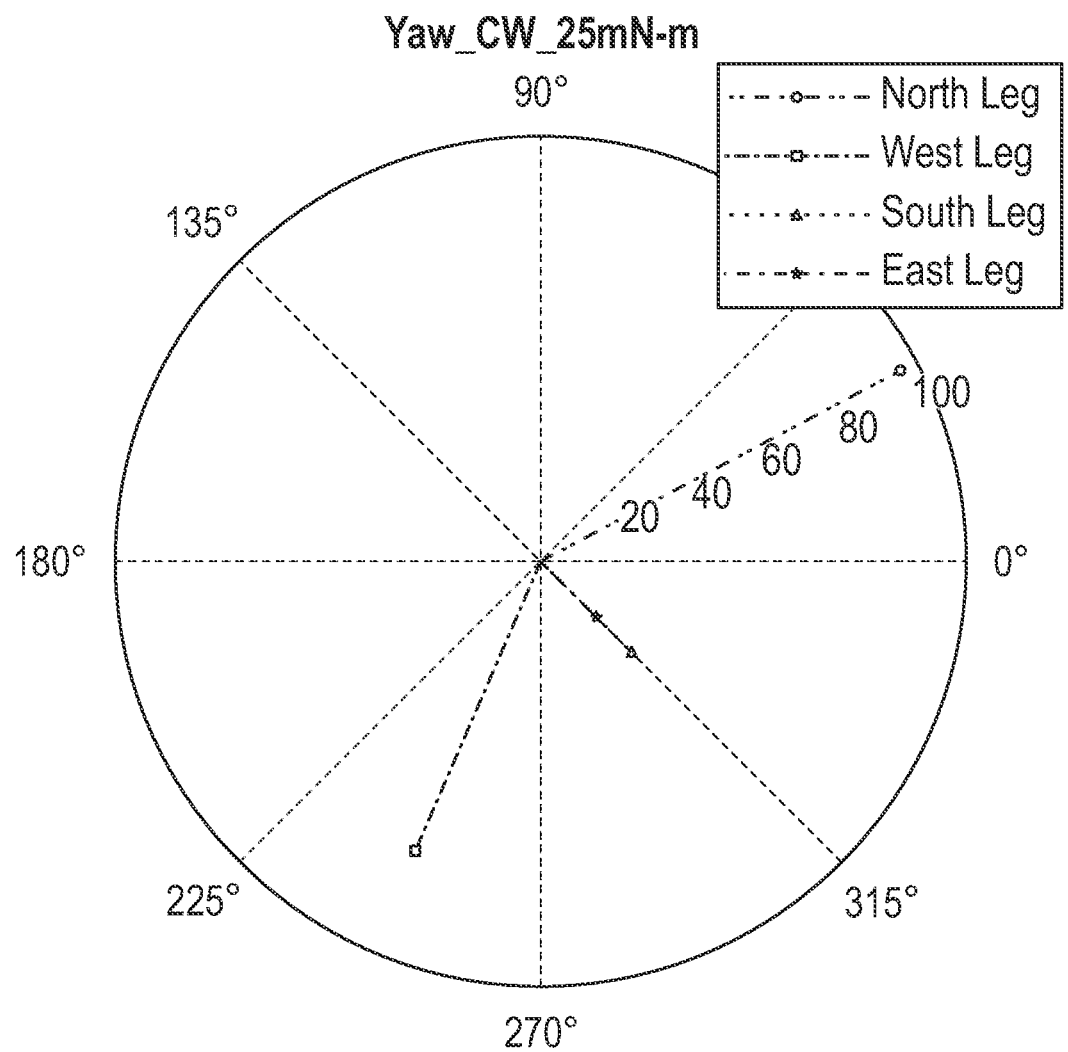
FIGS. 5 and 6 show the signal patterns associated with yaw clockwise and yaw counterclockwise maneuvers on the UIS device, respectively.
Figure 6:
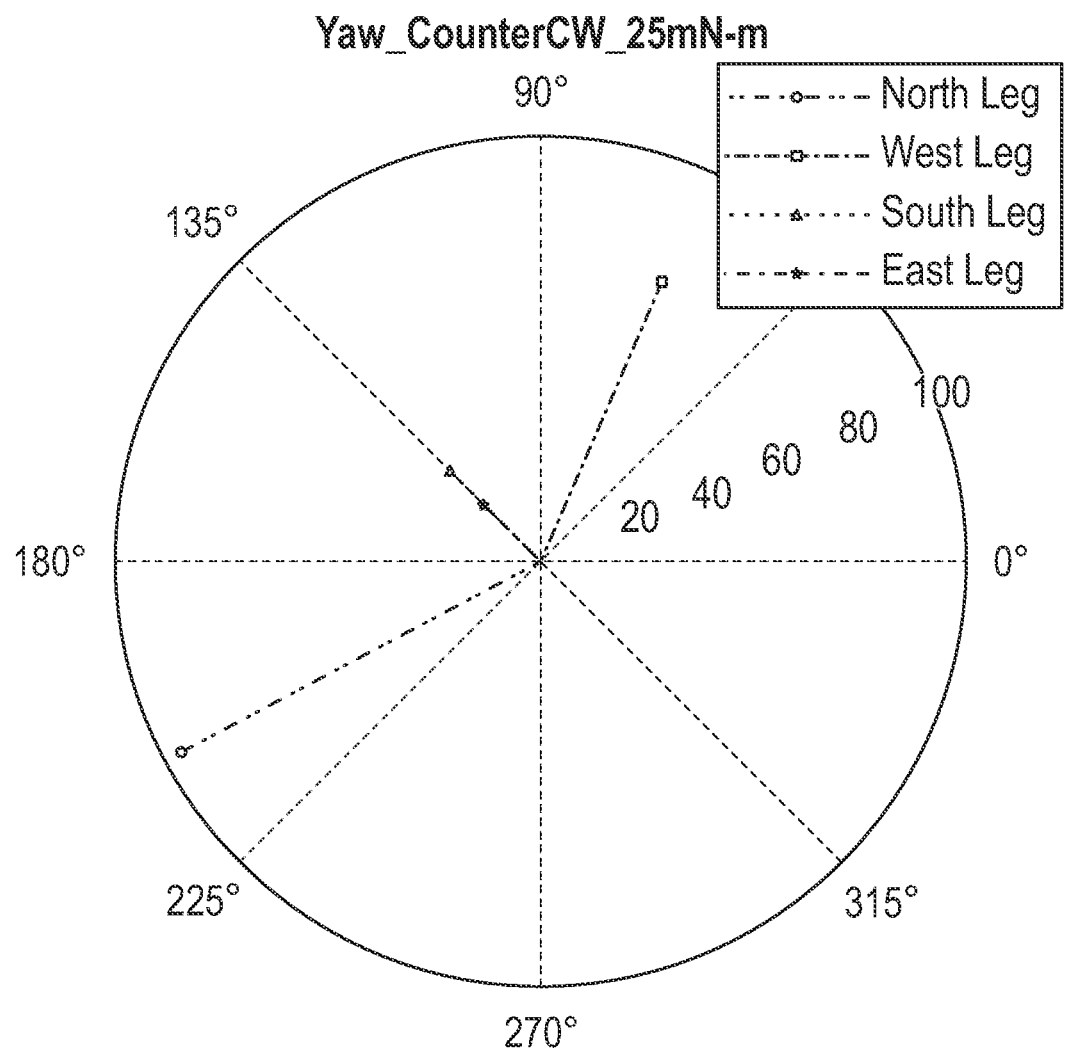

FIGS. 5 and 6 show simulated examples of the signal patterns when a user turns the UIS device in Yaw Clockwise and Yaw Counterclockwise maneuvers. The north, west, south and east legs shown in FIGS. 5 and 6 are the alternative names equivalent to Leg 1, 2, 3 and 4 defined in FIG. 4.

Figure 7:
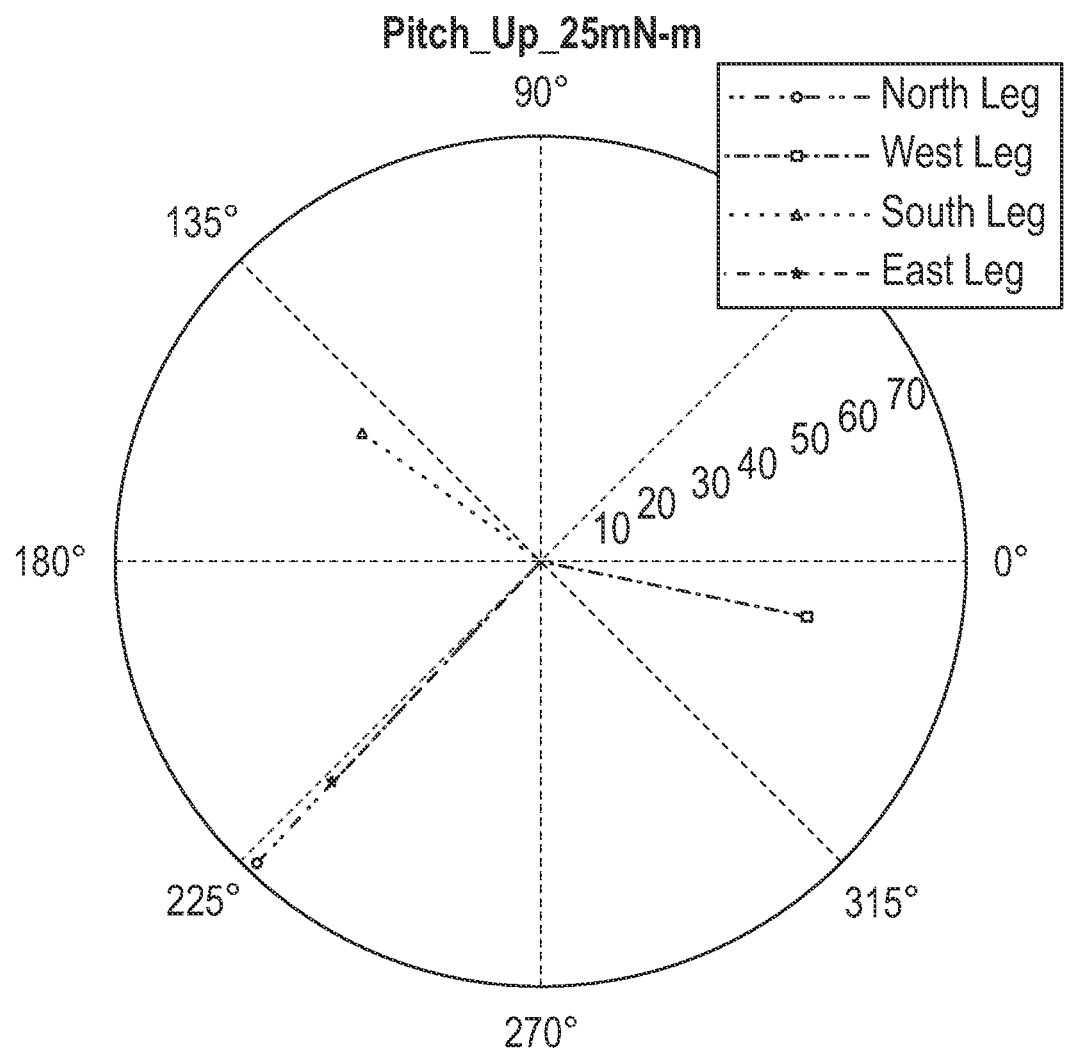
FIGS. 7 and 8 show the signal patterns associated with pitch up and pitch down maneuvers on the UIS device, respectively.
Figure 8:
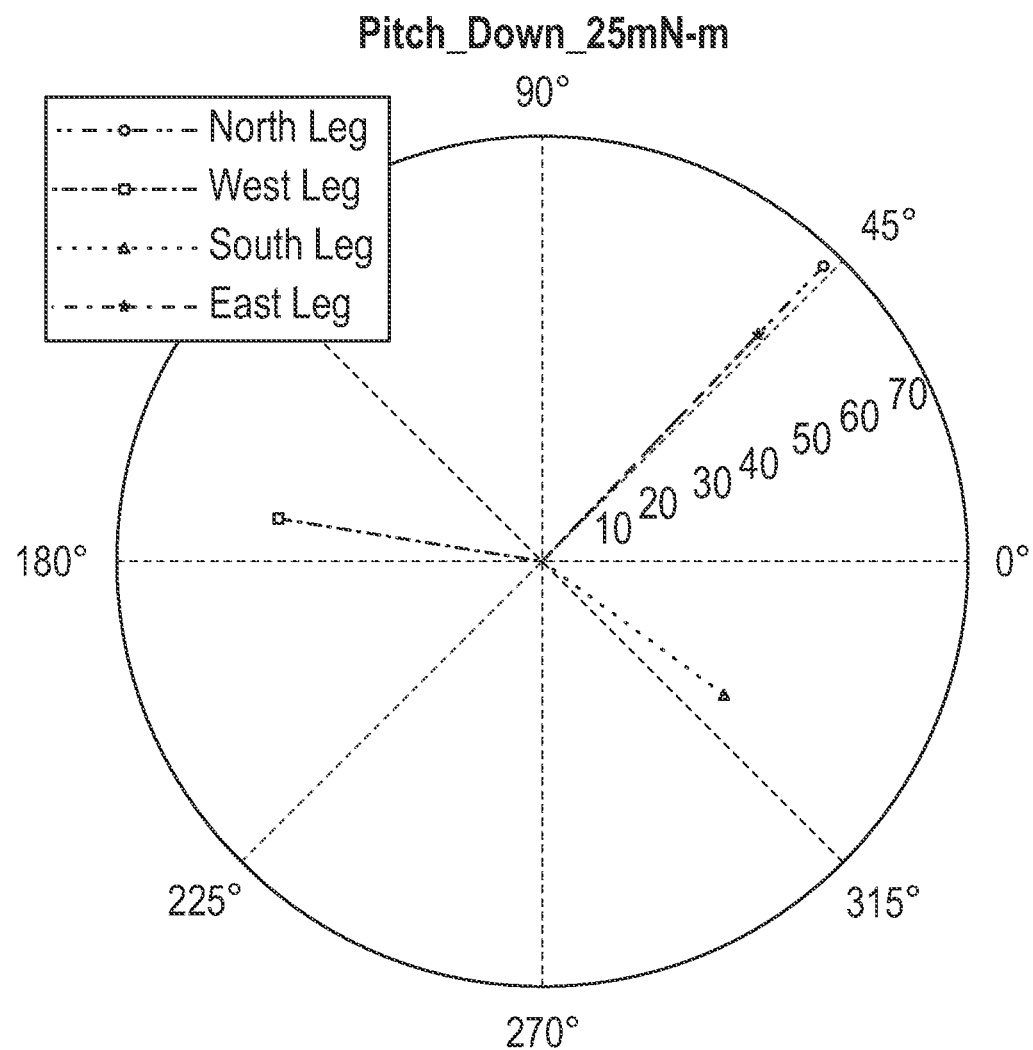

FIGS. 7 and 8 show simulated examples of the signal patterns when a user pitches the UIS device up and down.

Figure 9:
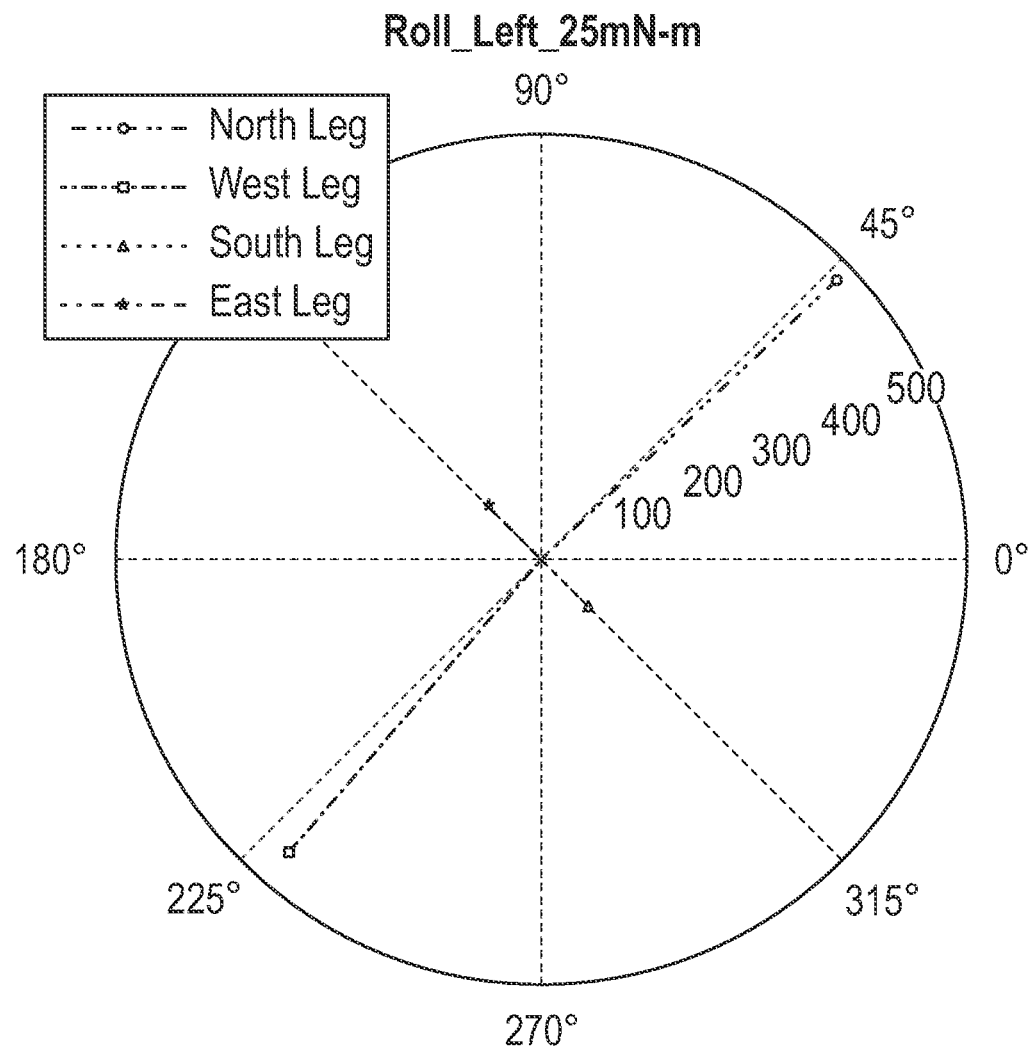
FIGS. 9 and 10 show signal patterns associated with roll left and roll right maneuvers on the UIS device, respectively.
Figure 10:
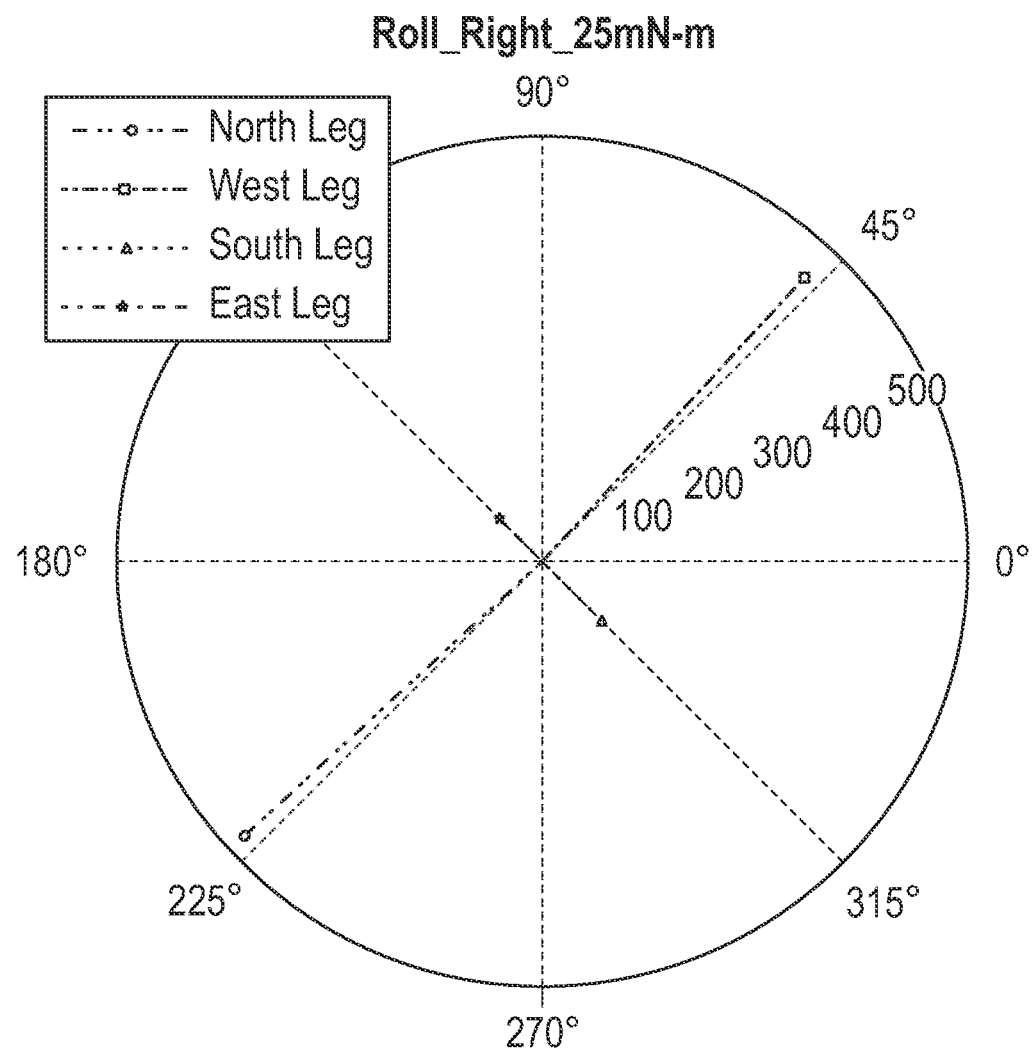
Figure 11:
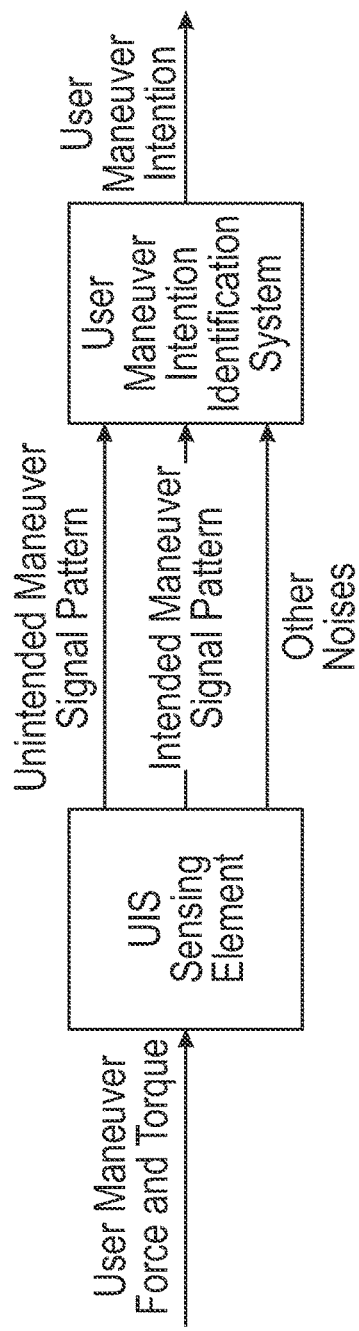
FIG. 11 is a block diagram conceptualizing a user maneuver intention identification process.

FIGS. 9 and 10 show simulated examples of the signal patterns when a user rolls the UIS device left and right. In the real world, when a user intends to maneuver in a specific operation, for example to pitch up on the UIS device, the signal pattern of the pitch up will appear with other noise vectors. This is because when a user is maneuvering in pitch up the user will normally press on the UIS device with some other force and torques applied to the UIS device at the same time to cause press down and/or other types of signal patterns to appear together with the intended pitch up maneuver. The real world signal pattern will deviate from the theoretical pure signal pattern as simulated in FIGS. 5 through 10. The deviation is caused by unintended forces and torques while the user is maneuvering for a specific intended operation.

TABLE 1

User Maneuver Intention - Examples

| Maneuver Name | Description |
| --- | --- |
| Press down at any location x | Using finger to press down at a point X on the UIS device surface |
| Pull up at any location y | Using finger to pull up at a point Y beneath the UIS device surface |
| Side push to left | Apply to whole device |
| Side push to right | Apply to whole device |
| Forward push | Apply to whole device |
| Backward push | Apply to whole device |
| Yaw turn CW | Apply to whole device |
| Yaw turn CCW | Apply to whole device |
| Pitch up | Apply to whole device |
| Pitch down | Apply to whole device |
| Roll left | Apply to whole device |

TABLE 1-continued

User Maneuver Intention - Examples

| Maneuver Name | Description |
| --- | --- |
| Roll right | Apply to whole device |
| Pinch in strength 1 | Apply to whole device |
| Pinch in strength 2 | Apply to whole device |
| Each maneuver above in stronger force or torque | This is the $2^{nd}$ step maneuver. An example of the application is, in window lifter case, the $1^{st}$ lighter maneuver would manually lift the window and the $2^{nd}$ stronger maneuver would automatically lift the window |

Figure 12:
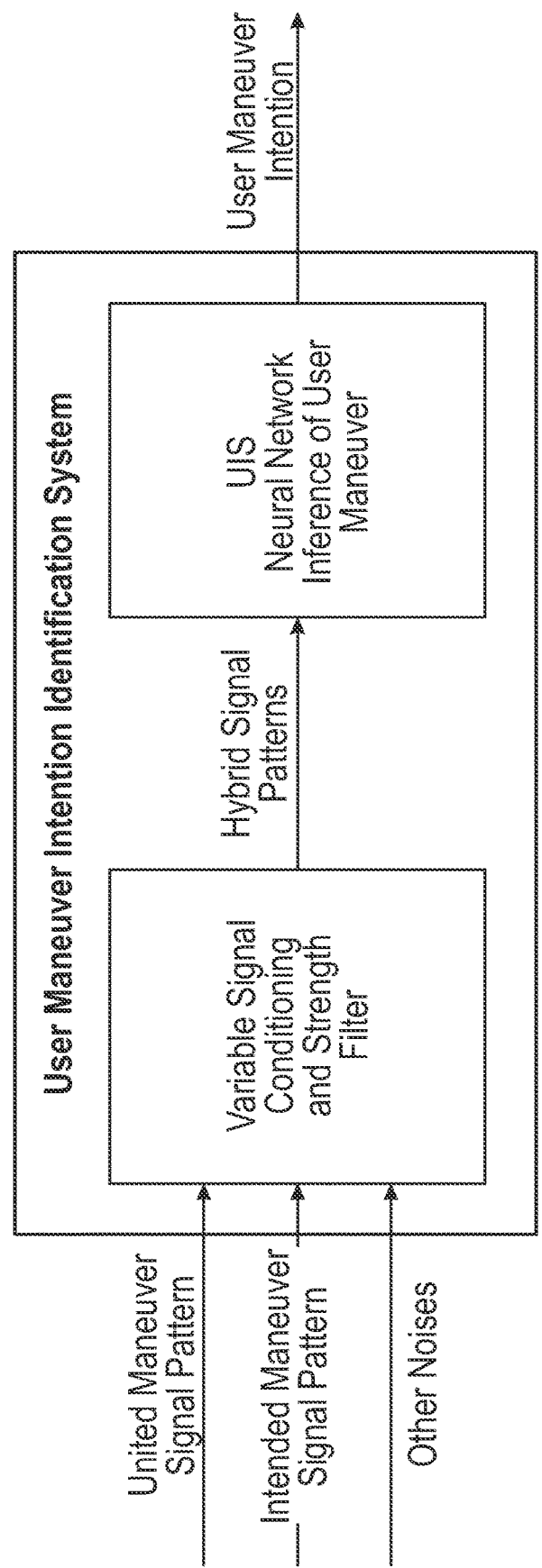
FIG. 12 is a block diagram showing a system for identification of user maneuver intentions.

The user maneuver intention identification system is mainly a UIS neural network inference system with a variable signal conditioning function, and a strength filtering function block that creates hybrid signal patterns to be inferenced in the UIS neural network. FIG. 12 demonstrates the system.

Figure 13:
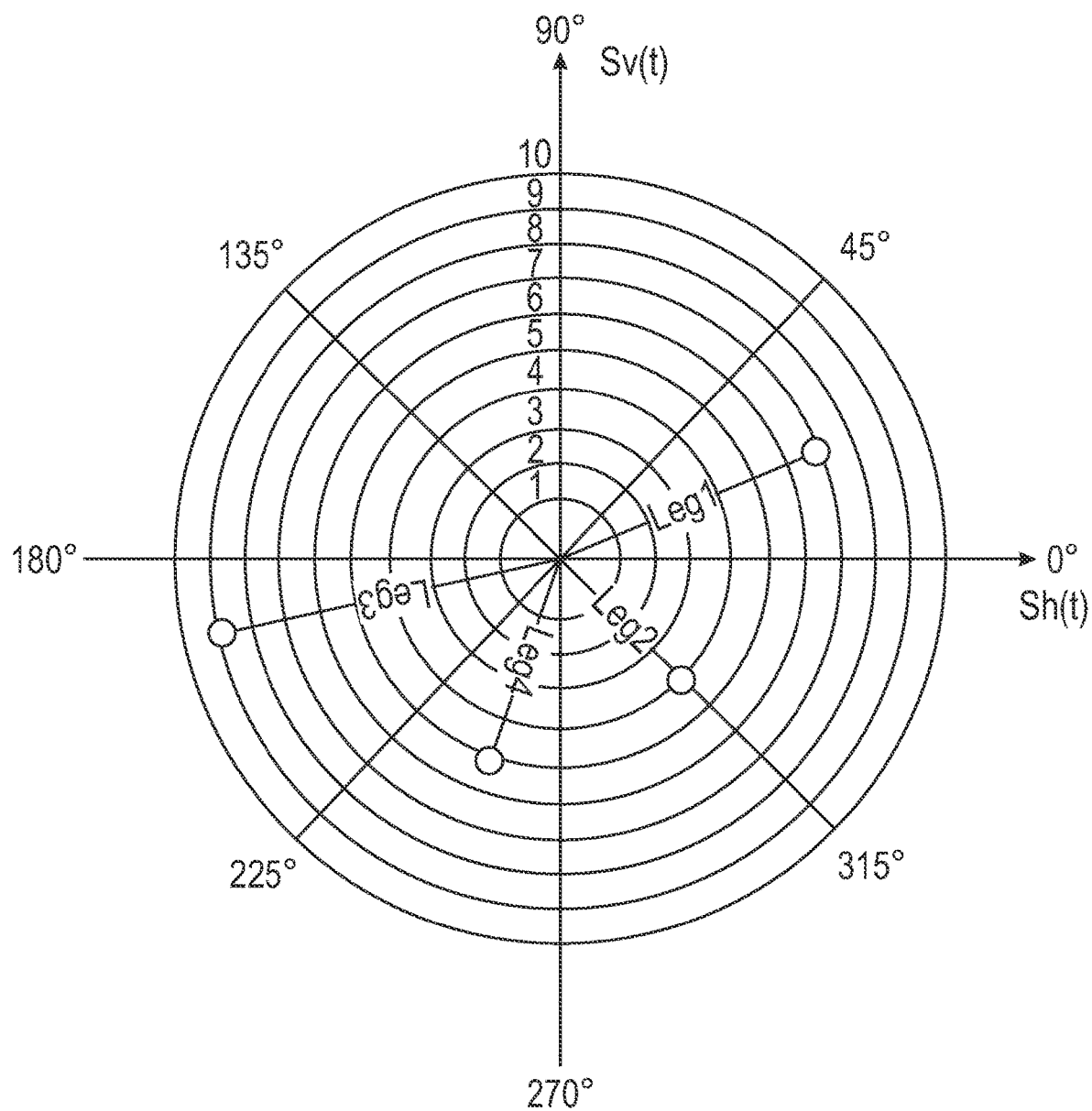
FIG. 13 is a raw signal pattern that includes intended user input, unintended user input, and other noises.
Figure 14:
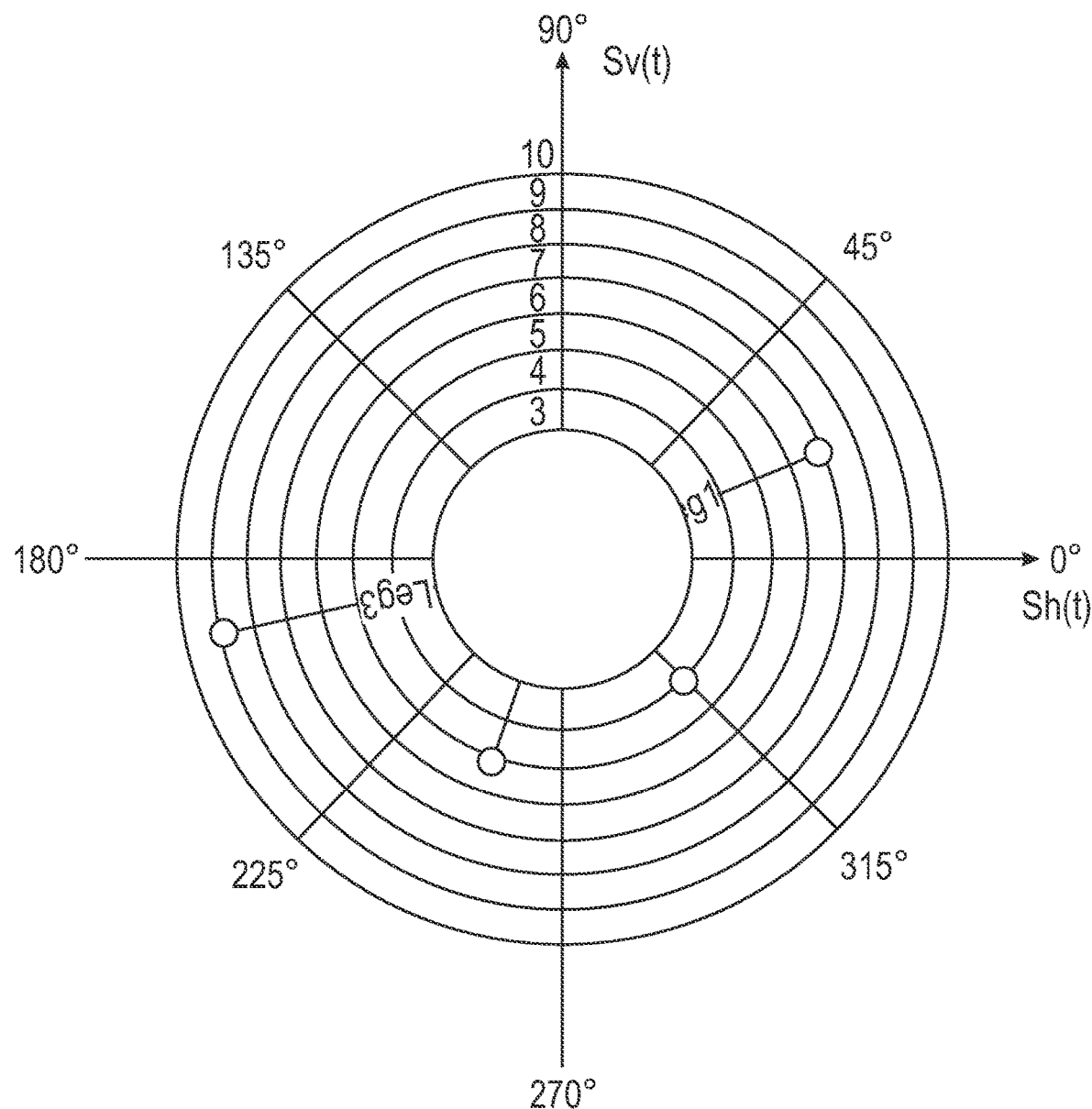
FIG. 14 is a processed or hybrid signal pattern from the raw signal pattern of FIG. 13 in which unintended user input and other noises have been filtered.

In the real world, when a user intends to maneuver in a specific operation, for example to pitch up on the UIS device, the signal pattern of the pitch up will appear but with other noise vectors appearing together. This is because when the user is operating the pitch up he will normally press on the UIS device and/or some other force and torques applied to the device to cause press down and other types of signal patterns to appear together with the intended pitch up operation. FIG. 13 shows the signal pattern of a maneuver that contains intended input, unintended input and other noises. FIG. 14 shows the signal pattern of the maneuver with strength filtering by cut off signals whose amplitude is less than a configurable threshold. The filtered signal pattern provides a clean hybrid signal pattern input to the UIS neural network to identify the user maneuver intention.

Figure 15:
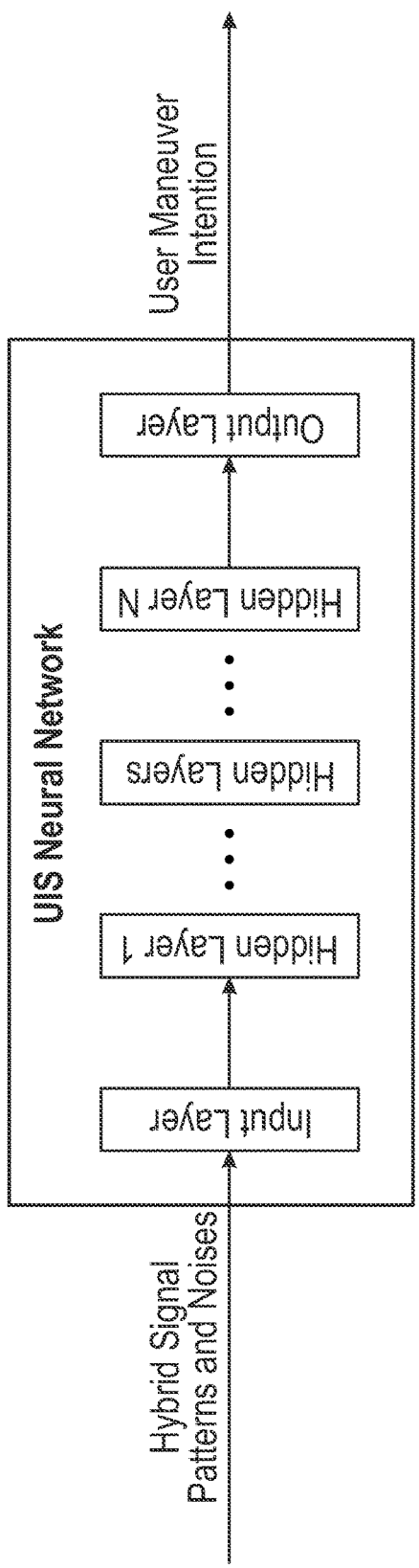
FIG. 15 is a schematic illustration of a neural network applied to the hybrid signal pattern inputs to accurately identify a user's intention.

FIG. 15 shows the UIS Neural Network applied to process the hybrid signal pattern inputs to output the identified user maneuver intention. The UIS Neural Networks may be implemented with multiple layers and each layer having multiple nodes. Recurrent Neural Networks (RNN) and other types of neural network techniques may be applied to effectively process signal patterns to output user maneuver intention with the optimized minimum number of the network nodes. UIS Neural Network is trained based on data source from the user maneuver signal patterns. For each maneuver shown but not limited in Table 1, the related signal pattern is collected, recorded and labeled. Data source is generated from different kinds of users so that the trained Neural Network is robust in identifying the user maneuver intention.

Figure 16:
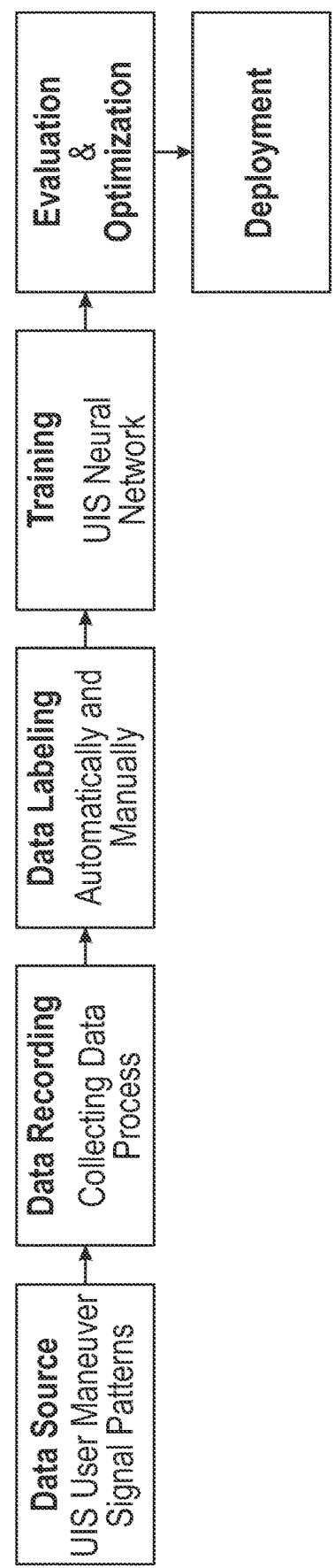
FIG. 16 is a block diagram showing a process for the neural network training and deployment to create machine learning based software for accurately determining user intention.

FIG. 16 shows the process of the UIS Neural Network training and deployment. The data source block is the process to design and organize data generation for user maneuvers. The data recording block is the process to collect data with tools and methods. The data labeling block is the process to label recorded data to associated maneuver automatically and manually based on tools and methods. The training block trains the UIS Neural Network using training tools based on UIS signal pattern data source. The Evaluation and Optimization Block is the test and validation of UIS Neural Network and the adjustment to reduce the number of nodes of the Neural Network to achieve the optimal result. The deployment block deploys the UIS Neural Network model for the inference of the user maneuver intention identification system shown in FIG. 12.

The method and system for identification of user maneuver intention is based on the UIS Neural Network. The data source to train the network is generated based on the signal patterns of the user maneuvers. The signal patterns are obtained by the UIS signal processing software that filters multiple strain sensor signals and generates the identifiable signal patterns of the user maneuvers. Once the UIS Neural Network is trained and optimized, it is deployed as a software component in the microprocessor of the system and, to identify the user maneuver intention through the inference to the UIS signal patterns generated from strain signals in real time.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

The invention claimed is:

1. A human-machine interface device, comprising:
a touch receiver having a plurality of touch surfaces, each touch surface arranged in a distinctly different plane from the other touch surfaces;
an elastic strain sensing element having a base and a plurality of legs extending from the base, each leg in contact with or attached to an associated overlying touch surface such that pressure applied to a touch surface causes strain in an associated leg;
a first linear strain gauge mounted on each leg to detect strain along a first direction and a second linear strain gauge mounted on each leg to detect strain along a second direction that is different from the first direction; and
a processor that is configured to receive a signal from each of the first linear strain gauge and the second linear strain gauge and determine a command intended by a user operation (maneuver) of the human-machine interface device.

2. The human-machine interface device of claim 1, wherein the first direction and the second direction are approximately perpendicular.

3. The human-machine interface device of claim 1, wherein each of the plurality of touch surfaces is arranged vertically.

4. The human-machine interface device of claim 1, wherein the plurality of touch surfaces are arranged in approximately parallel pairs.

5. The human-machine interface device of claim 1, wherein the plurality of touch surfaces include two pairs of approximately parallel touch surfaces.

6. The human-machine interface device of claim 1, wherein the first linear strain gauge of each leg is mounted to detect strain in an approximately vertical direction and the second linear strain gauge of each leg is mounted to detect strain in an approximately horizontal direction.

7. The human-machine interface device of claim 6, wherein the processor is configured to calculate a vector magnitude of strain on each leg, the vector magnitude being equal to a square root of a sum of squares of a vertical strain signal strength and a horizontal strain signal strength.

8. The human-machine interface device of claim 7, wherein the processor is configured to calculate a vector direction of strain on each leg, the vector direction being equal to an arctangent of a quotient of a vertical strain signal strength divided by a horizontal strain signal strength.

9. The human-machine interface device of claim 8, wherein the calculated vector magnitude and the calculated vector direction on each leg are grouped as strain signal patterns represented by a data set.

10. The human-machine interface device of claim 9, wherein the data set is collected by the processor to create a data source of the strain signal patterns for each of a plurality of user operations (maneuvers) of the human-machine interface device.

11. The human-machine interface device of claim 10, wherein the data source is used to train a neural network.

12. The human-machine interface device of claim 11, wherein the trained neural network is utilized to identify the intended user command of the operation (maneuver) of the human-machine interface device, wherein the identified user command intention is an inference output of the trained neural network with an input of the strain signal patterns generated by the user operation (maneuver).

13. The human-machine interface device of claim 12, wherein user operations (maneuvers) include pressing down at any location, pulling up at any location, pushing a side to left, pushing a side to right, pushing forward, pushing backward, turning clockwise, turning counterclockwise, pitching upward, pitching downward, rolling left, rolling right, and pinching.

* * * * *